(12) United States Patent
Glade et al.

(10) Patent No.: US 11,768,724 B2
(45) Date of Patent: *Sep. 26, 2023

(54) DATA AVAILABILITY IN A CONSTRAINED DEPLOYMENT OF A HIGH-AVAILABILITY SYSTEM IN THE PRESENCE OF PENDING FAULTS

(71) Applicant: Hewlett Packard Enterprise Development LP, Houston, TX (US)

(72) Inventors: Bradford Glade, Marlborough, MA (US); Peter F. Corbett, Lexington, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,500

(22) Filed: Oct. 11, 2021

(65) Prior Publication Data

US 2022/0027221 A1    Jan. 27, 2022

Related U.S. Application Data

(63) Continuation of application No. 16/577,043, filed on Sep. 20, 2019, now Pat. No. 11,144,374.

(51) Int. Cl.
*G06F 11/00* (2006.01)
*G06F 11/14* (2006.01)
(Continued)

(52) U.S. Cl.
CPC .............. *G06F 11/008* (2013.01); *G06F 1/30* (2013.01); *G06F 9/442* (2013.01); *G06F 11/0727* (2013.01); *G06F 11/1448* (2013.01)

(58) Field of Classification Search
CPC . G06F 11/008; G06F 11/0727; G06F 11/1448
(Continued)

(56) References Cited

U.S. PATENT DOCUMENTS 4,958,273 A    9/1990   Anderson et al.
5,956,489 A    9/1999   San et al.
(Continued)

OTHER PUBLICATIONS

Cisco, "Borderless Campus 1.0 Design Guide," 2019, pp. 1-63 (online), Retrieved from the Internet on May 29, 2019 at URL: <cisco.com/c/en/us/td/docs/soltions/Enterprise/Campus/Borderless_Campus_Network_1-0/Borderless_Campus_1-0_Design_Guide/BN_Campus_HA.html>.

(Continued)

*Primary Examiner* — Sarai E Butler
(74) *Attorney, Agent, or Firm* — Hewlett Packard Enterprise Patent Department (57) ABSTRACT

Example implementations relate to preserving data availability in a constrained deployment of an HA system (e.g., an HA storage system) in the presence of pending faults. According to an example, a first arbiter, acting as a witness to facilitate maintaining quorum for the HA system, and a first node are provided within a first failure domain; and a second arbiter, serving as a backup arbiter, and a second node are provided within a second failure domain. Responsive to receipt of an indication of a pending fault impacting the first failure domain by a member of the current configuration of the HA system, establishment of a new configuration, excluding the first arbiter and including the second arbiter, is initiated. Responsive to a majority of the current configuration installing the new configuration, the second arbiter is enabled to serve as the active arbiter by transferring state information to the second arbiter.

20 Claims, 8 Drawing Sheets

(51) Int. Cl.
*G06F 9/4401* (2018.01)
*G06F 1/30* (2006.01)
*G06F 11/07* (2006.01)

(58) Field of Classification Search
USPC .................................................. 714/1–57
See application file for complete search history.

(56) References Cited

U.S. PATENT DOCUMENTS

| | | | | |
|---|---|---|---|---|
| 6,389,551 | B1* | 5/2002 | Yount | G06F 11/2025 |
| | | | | 714/4.11 |
| 7,478,263 | B1* | 1/2009 | Kownacki | H04L 41/0663 |
| | | | | 714/4.11 |
| 7,502,954 | B1* | 3/2009 | Strickland | G06F 11/1662 |
| | | | | 714/13 |
| 7,574,623 | B1* | 8/2009 | Goel | G06F 11/1088 |
| | | | | 714/47.2 |
| 7,640,451 | B2 | 12/2009 | Meyer et al. | |
| 7,840,833 | B2 | 11/2010 | Tripathi et al. | |
| 8,676,751 | B2 | 3/2014 | Judin et al. | |
| 10,025,634 | B2 | 7/2018 | Goyal et al. | |
| 10,826,812 | B2 | 11/2020 | Casacio et al. | |
| 11,108,730 | B2 | 8/2021 | Vaidya et al. | |
| 11,288,237 | B2 | 3/2022 | Karampuri et al. | |
| 2008/0077635 | A1 | 3/2008 | Spomy et al. | |
| 2010/0131801 | A1* | 5/2010 | Baleani | G06F 11/184 |
| | | | | 714/48 |
| 2011/0107139 | A1* | 5/2011 | Middlecamp | G06F 13/36 |
| | | | | 714/E11.021 |
| 2011/0258302 | A1* | 10/2011 | Cole | G06F 11/006 |
| | | | | 707/769 |
| 2012/0047394 | A1* | 2/2012 | Jain | G06F 11/2028 |
| | | | | 714/E11.073 |
| 2012/0331332 | A1* | 12/2012 | Carey | G06F 11/1438 |
| | | | | 714/2 |
| 2015/0269042 | A1* | 9/2015 | Jain | H04L 67/1034 |
| | | | | 714/6.3 |
| 2015/0355971 | A1* | 12/2015 | Becker-Szendy | |
| | | | | G06F 11/1096 |
| | | | | 714/6.24 |
| 2016/0179411 | A1* | 6/2016 | Connor | G06F 11/1076 |
| | | | | 714/6.22 |
| 2017/0230298 | A1* | 8/2017 | Perry | H04L 47/522 |
| 2017/0235755 | A1* | 8/2017 | Karampuri | G06F 16/1844 |
| | | | | 707/620 |
| 2018/0234304 | A1 | 8/2018 | Chen et al. | |
| 2019/0332473 | A1 | 10/2019 | Yang et al. | |
| 2019/0354302 | A1 | 11/2019 | Enz et al. | |

OTHER PUBLICATIONS

Eric Siron, "How to Configure a File Share Witness for a Hyper-V Cluster," available online at <ttps://www.altaro.com/hyper-v/file-share-witness-hyper-v-cluster/>, Feb. 27, 2018, 12 pages.

Gerend et al., "Deploy a Cloud Witness for a Failover Cluster," available online at available online at <https://web.archive.org/web/20170710194637/https://docs.microsoft.com/en-us/windows-server/failover-clustering/deploy-cloud-witness>, Sep. 15, 2016, pp. 1-10.

John Marlin, "New File Share Witness Feature in Windows Server 2019," available online at <https://argonsys.com/microsoft-cloud/library/new-file-share-witness-feature-in-windows-server-2019/>, Apr. 16, 2018, 4 pages.

Lamport, Leslie, "Paxos Made Simple", Nov. 1, 2001, 14 pages.

* cited by examiner

DATA AVAILABILITY IN A CONSTRAINED DEPLOYMENT OF A HIGH-AVAILABILITY SYSTEM IN THE PRESENCE OF PENDING FAULTS

BACKGROUND

In the context of a highly available system it is desirable to place replicas of the data along with a component known as an "arbiter" in locations that are not subject to impact from the same fault condition. These locations are commonly known as "failure domains." The scope of a failure domain is the reach of impact of a set of fault conditions that the system is designed to tolerate. The role of the arbiter is to act as a witness to facilitate maintaining quorum for the system by participating in a consensus process implemented by the nodes of the system. While the practice of distributing replicas and the arbiter among separate failure domains is highly desired, it is often not possible to practically achieve for all of the potential classes of faults that a system may face.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to systems and methods for preserving data availability in the presence of pending faults by providing a standby arbiter function for a high-availability (HA) storage system. In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

As noted above, while it is generally desirable for an HA storage system to place replicas of the data and the arbiter functionality in separate failure domains, it is often not possible to practically achieve this for all of the potential classes of faults that an HA storage system may face. For example, a small company or small office may not have the resources and/or the physical space to deploy three failure domains (e.g., in the form of three separate racks of equipment, three separate equipment rooms or the like) and may therefore choose to combine the arbiter function in the same equipment rack as one of the data replicas. Such a deployment would allow the HA storage system to provide continuous data availability in the presence of a network partition isolating one equipment rack from the other and single component failures, but would not provide data availability for a fault that impacted an entire equipment rack.

Example embodiments described herein extend the data availability of such a constrained deployment with only two failure domains in the presence of a specific class of faults referred to herein as pending faults that impact a broader failure domain than can be tolerated by existing constrained deployments, in which the broader failure domain encompasses one of the data replicas as well as the arbiter function, thus improving the set of tolerable faults and availability of data in a constrained deployment scenario. Without the proposed capability described herein, a constrained deployment HA storage system subjected to such a fault would lose the availability of data while the condition persists.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

A "constrained deployment" generally refers to an HA storage system deployment that, for whatever reason, does not place the arbiter functionality in a failure domain separate from the failure domains in which one or more of the data replicas reside. For example, as described above, due to physical space constraints or resource limitations, a small company may include the arbiter function within the same failure domain (e.g., the same chassis, the same equipment rack or the same equipment room) as one of the data replicas. While such a constrained deployment is able to continue to provide data availability for limited failure scenarios, such a constrained deployment is unable provide data availability for a fault that impacts the entire failure domain in which the arbiter function resides as a result of not isolating the arbiter function within its own failure domain.

A "storage node" generally refers to an autonomous storage computing element. The storage nodes of an HA storage system may be computer systems (e.g., clients, servers or peers) in virtual or physical form, one or more components of a computer system, storage computing elements, hardware devices, software entities or processes, or a combination thereof. Non-limiting examples of storage nodes include a software process (e.g., a client or a server), a virtual machine, a virtual controller running storage stack software, a storage server, and a HyperConverged Infrastructure (HCI) platform.

A "storage cluster" generally refers to a collection of multiple storage nodes that work together. Typical reasons for clustering storage nodes include high availability, load balancing, parallel processing, systems management and scalability. "High-availability storage clusters" (also referred to as failover storage clusters or HA storage clusters/systems) improve the availability of data. As described further below, HA storage clusters typically operate by having redundant storage nodes which are then used to maintain the availability of data despite the occurrence of various failure scenarios (e.g., a node failure and/or a network partition) for which the storage cluster may be designed to tolerate.

A "failure domain" generally represents a collection of system elements, which tend to fail together for specific failure conditions. For instance, in the presence of a power failure limited to a particular equipment rack, hardware components deployed in the particular equipment rack will fail together; however, components deployed in a different equipment rack would be unaffected by this failure. A failure domain typically includes a set of resources that provide a service to users and fails independently of other failure domains that provide that same service. In order for failure domains to be independent, failure domains should not share resources, such as network or power. Since network and power are common sources of faults, fault boundaries often align to physical structural elements such as buildings, rooms, racks, and power supplies. Non-limiting examples of failure domains include different chassis within the same equipment rack, different equipment racks within the same equipment room, different equipment rooms within the same building, different buildings within the same geographical region, and different buildings (e.g., data centers) in different geographical regions.

A "pending fault" generally refers to a type or class of fault that is expected to imminently impact a larger failure domain than a constrained deployment of an HA storage system is typically designed to tolerate and for which the HA storage system can be provided sufficient advanced notice to take affirmative action to preserve quorum before the impact of the fault. Non-limiting examples of pending faults include imminent power loss, for example, as indicated by activation of a backup power supply or as indicated by a notification or signal indicative of a planned shutdown, or some other imminent administrative maintenance action, for example, as indicated by an administrator, that may impact a larger failure domain (e.g., the entire failure domain) than the constrained deployment is typically designed to tolerate. For example, it is often the case that equipment is moved within an equipment rack, within an equipment room or from one equipment room to another to free up space for a new component and an HA storage system may need to be brought offline during such an action. Various embodiments described herein can help automate and increase data availability by a constrained deployment of an HA storage system in the presence of pending faults. Those skilled in the art will appreciate a variety of other faults fall within the description of a "pending fault" provided herein. For example, a sensor (e.g., a temperature sensor, a smoke sensor, a vibration sensor, a water leak detector or the like) can provide advanced warning of an imminent fault (e.g., overheating, a fire, an earthquake, a flood or the like) that might represent a pending fault in a particular implementation.

A "quorum" generally refers to the minimum number of votes that a particular type of operation has to obtain in order to be allowed in the context of a distributed system. According to one embodiment, a quorum is a strict majority of the weighted votes of the nodes associated with an HA storage cluster. Examples of operations that may require quorum include, but are not limited to, continuing service after a network partition, reconstitution/reconfiguration of the HA storage cluster, and continuing service after one or more nodes have failed.

A "quorum evaluation process" generally refers to a consensus algorithm. A non-limiting example of a quorum evaluation process is the Paxos algorithm. Another commonly used technique for solving the consensus problem is known as "Virtual Synchrony."

An "arbiter" generally refers to a process or node that acts as a witness to maintain quorum for an HA storage system to ensure data availability and data consistency should a node of the HA storage system experience downtime or become inaccessible. The term "witness" is a term of art generally referring to the arbiter's limited role of providing a tie-breaking vote as part of a quorum evaluation process when a current cluster configuration of which it is a part contains an even number of nodes, for example, and the arbiter's lack of participation in the service provided to users (e.g., people or applications) of the HA storage system. According to one embodiment, the arbiter provides a vote in the quorum evaluation process implemented by an HA storage system and due to costs or space constraints, for example, is located in the same failure domain as a subset of one or more storage nodes of the HA storage system. In this manner, should equal sized groups of nodes become partitioned from each other, the arbiter allows one group to achieve quorum and form a reconstituted cluster, while the other group is denied quorum and cannot form a reconstituted cluster.

Figure 1A:
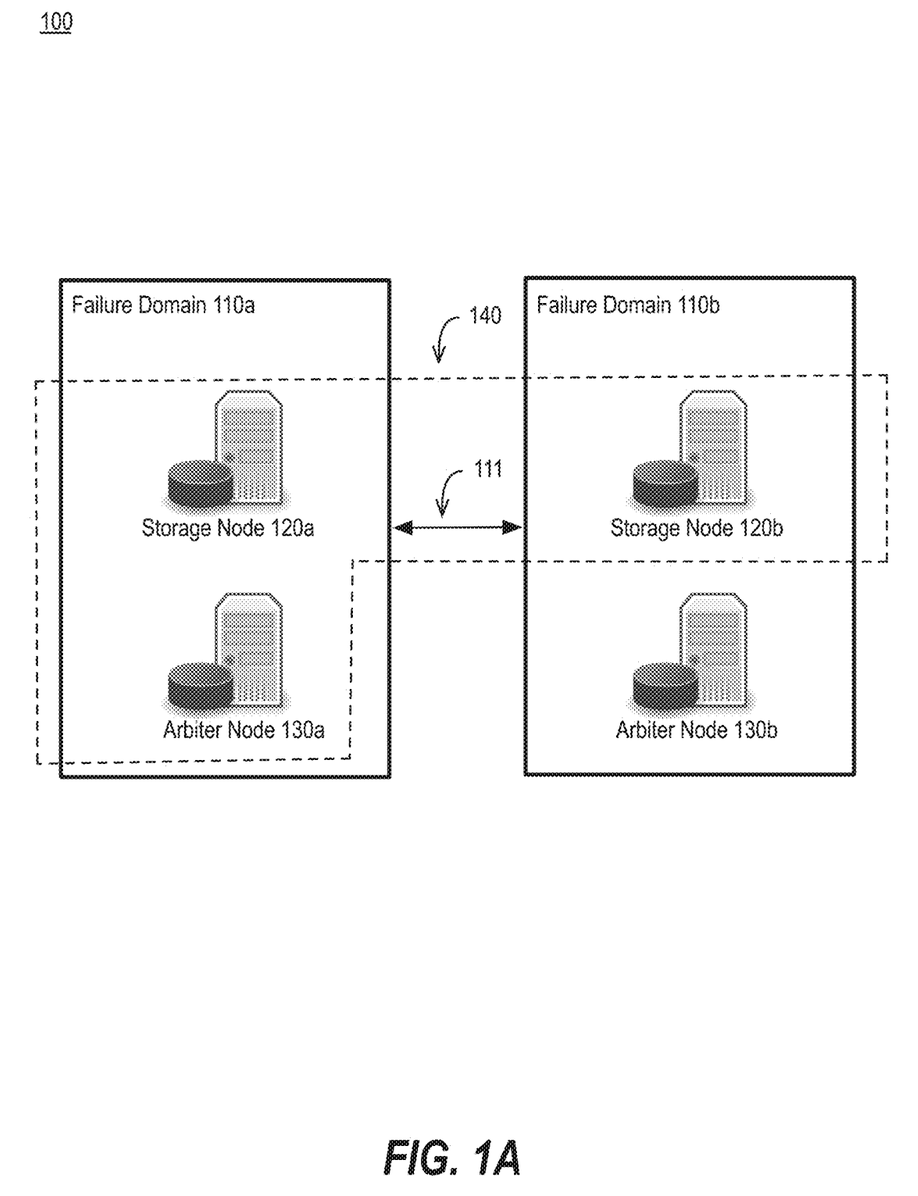
FIG. 1A is a block diagram depicting an initial configuration of a high-availability (HA) storage system with redundant arbiter nodes in a constrained deployment in accordance with an embodiment.

Referring now to FIG. 1A, a block diagram depicting an initial configuration 140 of a high-availability (HA) storage system 100 with redundant arbiter nodes 130*a-b* in a constrained deployment in accordance with an embodiment. Depending upon the needs of the particular implementation, the HA storage system 100 may be configured in accordance with an active/passive replication architecture or an active/active replication architecture. In either case, the data replicas may be synchronized so as to be in a consistent state and reflect the current state of the application or service being supported by the HA storage system 100.

While in the context of various examples presented herein, an HA storage system may be described as having a specific number of storage nodes and/or arbiters, those skilled in the art will appreciate the approach described herein is not limited to the particular examples and may be implemented in the context of HA systems having different numbers of nodes and different configurations, including, for example, configurations having a greater number of replicas and no arbiter.

In example embodiments, an additional component, which serves a standby or backup arbiter function is employed in addition to the other components of a conventional replication architecture (i.e., at least one active data replica associated with an active storage node, at least one additional data replica associated with another active or a passive storage node and an arbiter). This standby arbiter function does not provide its normal arbiter role while the other components of the system are functioning normally as doing so could lead to an ambiguous situation in which the failure of an arbiter coupled with its co-located data replica, for example, cannot be distinguished from a partition between these two components and the other arbiter/data replica pair, for example. That is, an odd number of components is used to disambiguate these two scenarios. As such, in example embodiments, this standby arbiter plays a passive role until a triggering condition is received notifying the system regarding a pending fault.

As noted above, it is desirable to spread storage nodes of an HA storage system across multiple failure domains in order to avoid a potential single point of failure for the entire HA storage system in the event of a disaster. In the context of the present example, due to physical space limitations or other constraints, the HA storage system 100 is spread across only two failure domains 110a-b, with storage node 120a operating within failure domain 110a and storage node 120b operating within failure domain 110b. A communication link 111 couples the failure domains 110a-b in communication to facilitate communications (e.g., message passing and/or heartbeats) between nodes 120a and 130a and nodes 120b and 130b. Depending upon the particular implementation, the communication link 111 may include one or more of a bus, a switch fabric, a wireless or wired network, or a combination thereof.

Continuing with the present example, rather than having arbiter functionality located in a failure domain separate from failure domains 110a-b in which storage nodes 120a-b of the HA storage system 100 reside, for whatever reason, as described above, an arbiter node 130a is co-located with a subset (i.e., storage node 120a in this case) of the storage nodes 120a-b of the HA storage system 100. However, in the context of the present example, the HA storage system 100 further includes an additional arbiter node 130b that serves as a backup or standby arbiter so as to provide data availability in the presence of a specific class of faults referred to herein as "pending faults" that impact a broader failure domain than can be tolerated by existing constrained deployments.

In embodiments of the present example, only one of the multiple storage nodes 120a-b is considered to be the active data replica, and the other data replica is synchronized by way of synchronous replication, for example. For purposes of the present example, storage node 120a is assumed to host the active data replica. Similarly, as noted above, only one of arbiter nodes 130a-b is active and performs conventional arbiter functionality. In the context of the present example, arbiter node 130a is the active arbiter as defined by the initial configuration 140 and arbiter node 130b is the standby or backup arbiter. As such, unless or until an indication regarding a pending fault is received that will impact failure domain 110a, arbiter node 130b will remain passive and will not perform traditional activities of an arbiter. According to one embodiment, the initial configuration 140 can be made deterministic upon the initialization of the HA storage system 100 by employing a deterministic algorithm which chooses which arbiter node 130a or 130b will serve as the initial "active arbiter." For example, such a choice can be made by selecting the arbiter node 130a or 130b whose execution environment has a unique identifier (e.g., a serial number or a globally unique identifier (GUID)) which is first when sorted alphanumerically. Those skilled in the art will recognize various other deterministic selection methods are equally well suited. Similarly, which of storage nodes 120a and 120b hosts the active data replica can be determined and the state of the current active configuration of components can be maintained by the current active configuration.

Figure 1B:
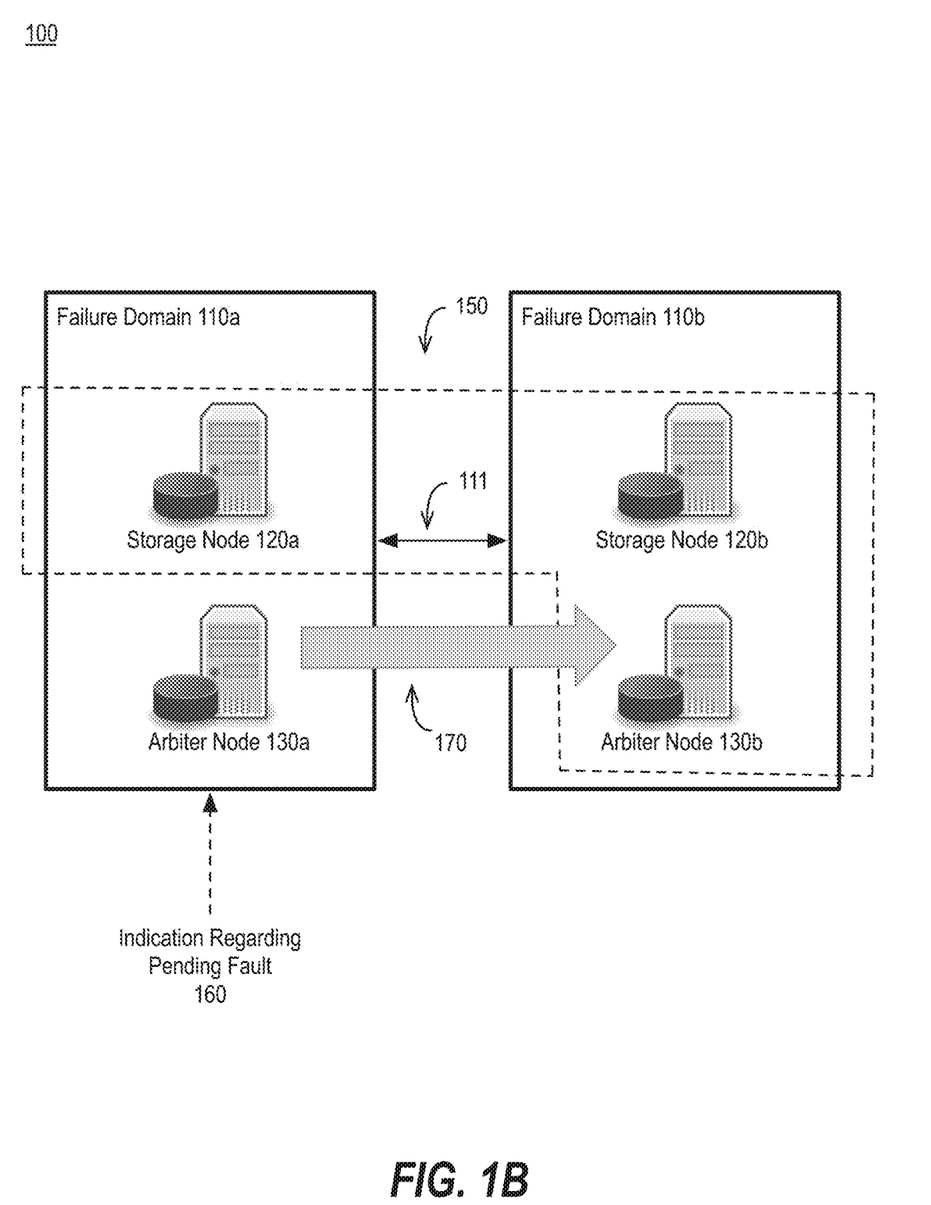
FIG. 1B is a block diagram of the HA storage system of FIG. 1A following receipt of an indication regarding a pending fault in accordance with an embodiment.

FIG. 1B is a block diagram of the HA storage system 100 of FIG. 1A following receipt of an indication regarding a pending fault 160 in accordance with an embodiment. In the context of the present example, prior to receipt of an indication regarding a pending fault, the HA storage system 100 is operating in the initial configuration illustrated in FIG. 1A; however, upon receipt of the indication regarding the pending fault 160, because the active arbiter (i.e., arbiter node 130a) and the active data replica (i.e., storage node 120a) are subject to the pending fault, one or both of the arbiter node 130a and storage node 120a attempt to instantiate a new configuration 150 of the HA storage system 100 so as to preserve quorum and hence ongoing data availability after impact of the pending fault.

In the context of the present example, the new configuration 150 includes storage node 120a, storage node 120b and arbiter node 130b and excludes the initially active arbiter (i.e., arbiter node 130a). As those skilled in the art will appreciate, in a three voter system, instantiation of the new configuration involves at least two of the three participants in the current configuration (i.e., initial configuration 140) deciding to install the new configuration.

Once the new configuration 150 is decided, one of the active members (i.e., storage node 120a, storage node 120b and arbiter node 130a) of the previous configuration (i.e., initial configuration 140) transfers state information to arbiter node 130b that enables it to serve as an active arbiter. Once removed from the active configuration, arbiter node 130a enters the standby arbiter role and serves in this passive role. Non-limiting examples of state information that may be transferred to enable the backup/standby arbiter to assume the role of the active arbiter include (i) a state of the current configuration of an HA system (e.g., HA storage system 100); and (ii) an instance of a key-value store maintained by one or more nodes (e.g., storage nodes 120a-b and arbiter node 130a) of the previous configuration an HA system (e.g., HA storage system 100). An example of the key-value store is described further below with reference to FIG. 6.

In this manner, in contrast to a conventional constrained deployment scenario, in the context of the present example, after failure domain 110a fails as a result of the impact of the pending fault, storage node 120b and arbiter 130b form a majority of the current configuration (i.e., new configuration 150) and are therefore able to establish the quorum condition necessary to continue to serve data from storage node 120b while storage node 120a is offline.

As illustrated below with reference to FIG. 6, a hypervisor system that is impacted by the fault will failover guest virtual machines (VMs) from the impacted failure domain to the surviving failure domain and the data consumed by these VMs will remain available. Likewise, VMs that are running on separate nodes that are consuming storage from a Hyper-Converged Infrastructure (HCI) node impacted by the failure can continue to access their data unabated.

Figure 2A:
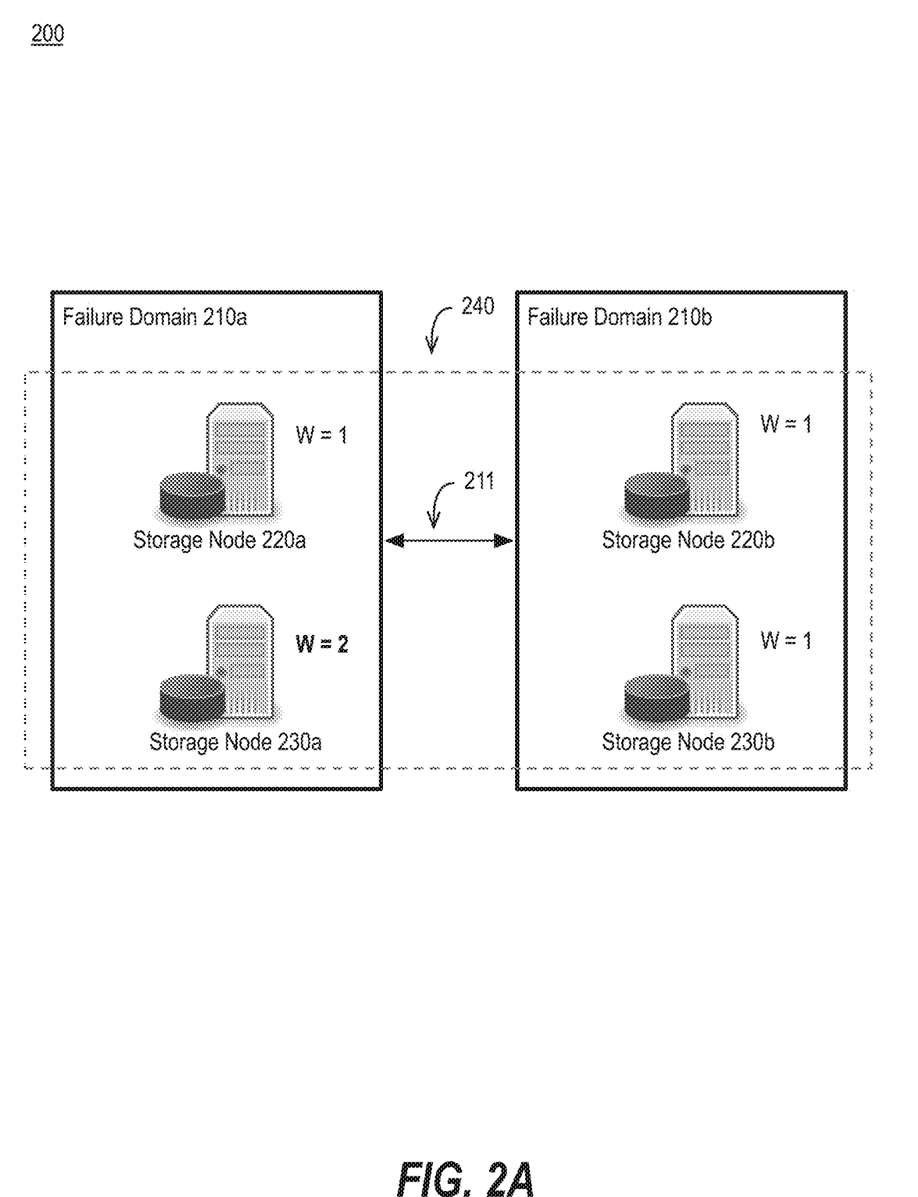
FIG. 2A is a block diagram depicting an initial configuration of an HA storage system in a constrained deployment in accordance with an alternative embodiment.

FIG. 2A is a block diagram depicting an initial configuration 240 of an HA storage system 200 in a constrained deployment in accordance with an alternative embodiment. In accordance with an alternative embodiment, the role of the arbiter in serving as a disambiguator (as described above in connection with FIGS. 1A-1B) is replaced by giving one node of an even number of storage nodes a greater weight than the weight assigned to the others. Also, the act of installing a new configuration with the standby arbiter is replaced by installing a new configuration of weighted values with selection of the replica that carries the greater weight shifted over to a replica in the non-impacted failure domain.

In the context of the present example, rather than having arbiter functionality located in a failure domain separate from failure domains 210a-b in which storage nodes 220a-b of the HA storage system 100 reside, two additional storage nodes (i.e., storage node 230a-b) are co-located with storage nodes 220a-b, respectively. As above, a communication link 211 couples the failure domains 210a-b in communication to facilitate communications (e.g., message passing and/or heartbeats) between nodes 220a and 230a and nodes 220a and 230b. Depending upon the particular implementation, the communication link 211 may include one or more of a bus, a switch fabric, a wireless or wired network, or a combination thereof.

In the context of the present example, an initial configuration 240 of the HA storage system 200 includes four data replicas (i.e., hosted by storage nodes 220a-b and storage nodes 230a-b) spread across the two failure domains 210a-b with a particular assignment of weighted values. As noted above, instead of an arbiter serving as a disambiguator, one storage node (i.e., storage node 230a) of the HA storage system is assigned a weight of 2, while the other storage nodes (i.e., storage nodes 220a-b and storage node 230b) have a weight of 1. As such, data availability can be maintained in the presence of a pending fault in the context of this constrained deployment by shifting the weight of 2 from the storage node 230a carrying the extra weighting to one of the storage nodes in the non-impacted failure domain (i.e., storage node 220b and storage node 230b).

As described above with reference to FIG. 1A, according to one embodiment, the initial configuration 240 can be made deterministic upon the initialization of the HA storage system 200 by employing a deterministic algorithm which chooses which of storage nodes 220a-b and storage nodes 230a-b will carry the additional weight. For example, such a choice can be made by selecting among the storage nodes 220a-b and the storage nodes 230a-b based on a unique identifier (e.g., a serial number or a globally unique identifier (GUID)) associated with their respective execution environments. For example, the unique identifier that is first when sorted alphanumerically. Those skilled in the art will recognize various other deterministic selection methods are equally well suited.

Figure 2B:
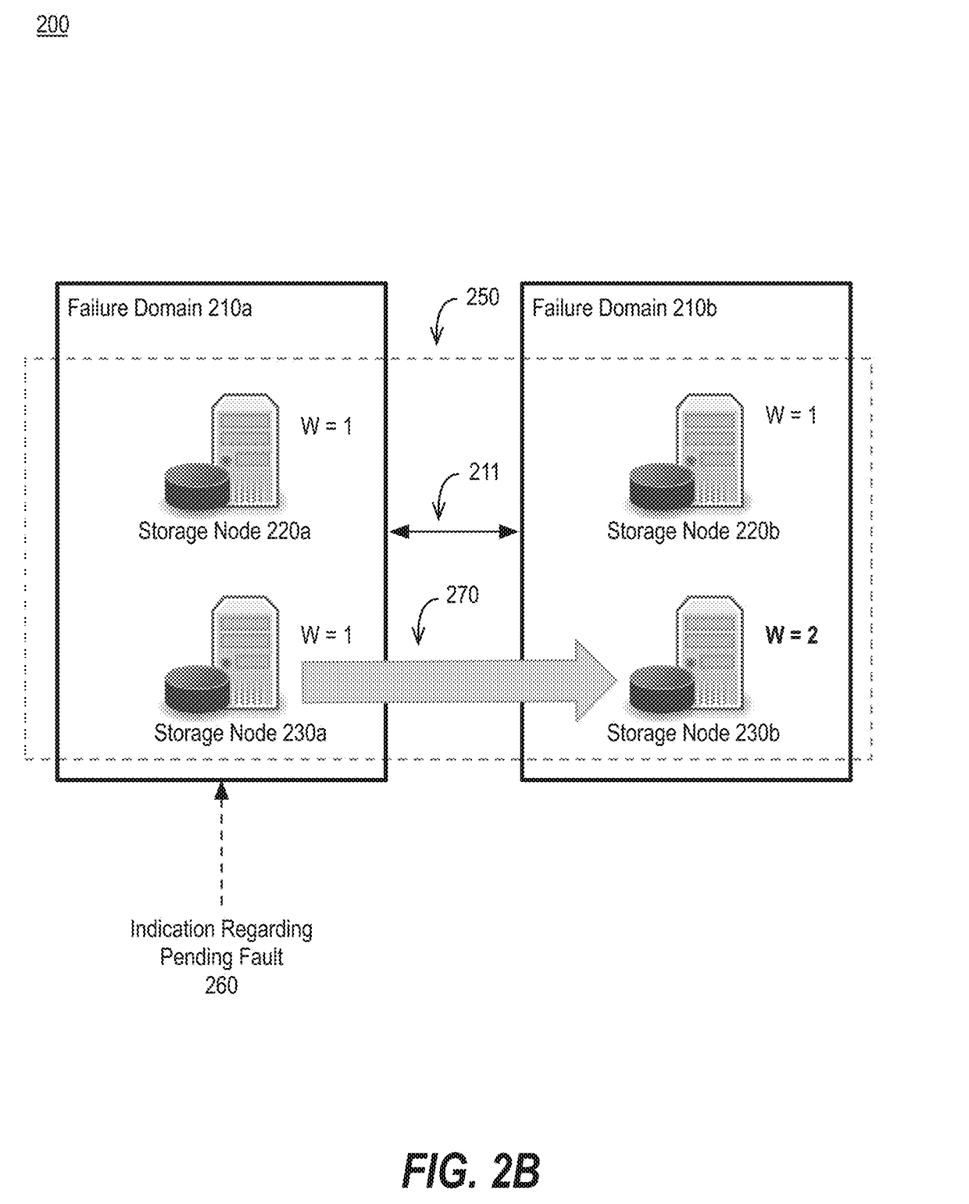
FIG. 2B is a block diagram of the HA storage system of FIG. 2A following receipt of an indication regarding a pending fault in accordance with an embodiment.

FIG. 2B is a block diagram of the HA storage system of FIG. 2A following receipt of an indication regarding a pending fault in accordance with an embodiment. In the context of the present example, prior to receipt of an indication regarding a pending fault, the HA storage system 200 is operating in the initial configuration illustrated in FIG. 2A; however, upon receipt of the indication regarding the pending fault 260, because the storage nodes 220a and 230a having the majority of votes are subject to the pending fault, one or both of storage node 220a and storage node 230a attempt to instantiate a new configuration 250 of the HA storage system 200 so as to preserve quorum and hence ongoing data availability after impact of the pending fault.

In the context of the present example, the new configuration 250 includes storage nodes 220a-b and storage nodes 230a-b, but with the weight of 2 shifted 270 from storage node 230a to storage node 230b. In this manner, in contrast to a conventional constrained deployment scenario, in the context of the present example, after failure domain 210a fails as a result of the impact of the pending fault, storage node 220b and storage node 230b form a majority of the current configuration (i.e., new configuration 250) and are therefore able to establish the quorum condition necessary to continue to serve data while storage nodes 220a and 230a are offline.

While in the examples described above, an HA storage system having two storage nodes and redundant arbiters and an HA storage system having four storage nodes with no arbiter are described, those skilled in the art will appreciate the approach described herein is also applicable to (i) HA storage systems having a larger even number of replicas with redundant arbiters and (ii) HA storage systems having a greater even number of storage nodes with no arbiter.

Figure 3:
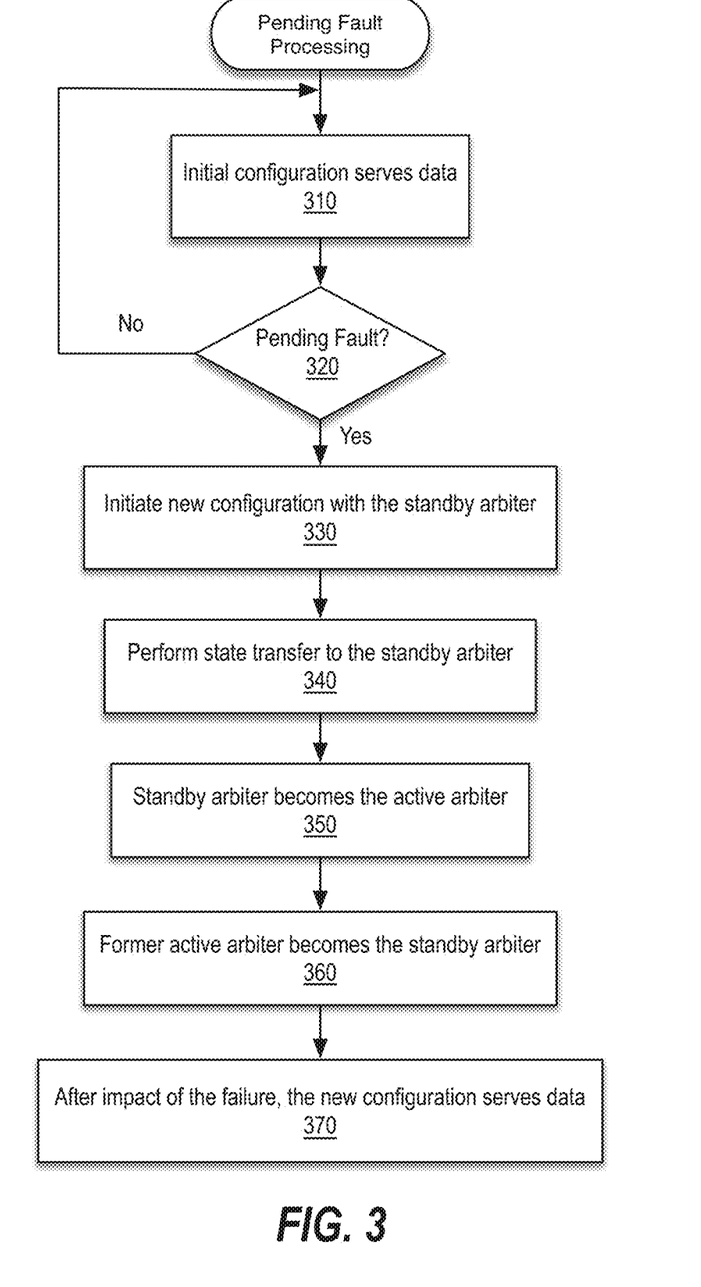
FIG. 3 is a flow diagram illustrating pending fault processing in accordance with an embodiment.

FIG. 3 is a flow diagram illustrating pending fault processing in accordance with an embodiment. The processing described with reference to FIG. 3 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more nodes of various forms, such as the nodes described with reference to FIG. 5 and/or FIG. 6 below. For sake of brevity, this flow diagram and the below description focus on processing related to various aspects of responding to a notification regarding a pending fault. Those skilled in the art will appreciate the components of the HA storage system may perform various other processing (e.g., the operations and processes performed in connection with providing or otherwise supporting a particular service by the HA storage system). For example, prior to commencement of pending fault processing, it is assumed an initial configuration of a constrained deployment of an HA storage system has been established in which one failure domain includes a data replica and an active arbiter and the other failure domain includes a data replica and a standby or backup arbiter.

At block 310, the initial configuration (e.g., initial configuration 140) serves data to users (e.g., people or applications) of the HA storage system.

At decision block 320, the HA storage system determines whether an indication regarding a pending fault (e.g., indication regarding pending fault 160) has been received. In one embodiment, the indication regarding the pending fault is directed to the failure domain that is expected to imminently be impacted. In an alternative embodiment, the indication regarding the pending fault can be received by any member of a current configuration of the HA storage system. In an implementation in which the indication regarding the pending fault is observed by more than one member of the current configuration or by more than one node within the failure domain, various deterministic approaches may be employed to select the particular node to take action (the node at issue) responsive to the indication regarding the pending fault. For example, the node at issue may be determined based on the unique identifiers of the respective execution environments.

Those skilled in the art will appreciate there are a variety of mechanisms by which the indication regarding the pending fault may be conveyed. For example, the indication regarding the pending fault may be in the form of an interrupt (e.g., a signal to a processing resource of a storage node or an arbiter node emitted by hardware or software indicating an event that needs immediate attention). Alternatively, the state of a register or a pin can be polled at a certain frequency to identify the existence of an indication regarding a pending fault. Other non-limiting examples of mechanisms notifying the HA storage system regarding the pending fault include a message transmitted by a software component when a maintenance action is about to take place, or a signal or message sent by a hardware sensor, such as a vibration detector. In any event, when an indication regarding a pending fault has been received, processing continues with block 330; otherwise processing loops back to block 310 and the node at issue (e.g., storage node 120a or arbiter node 130a) continues with its current task and the initial configuration continues to serve data.

For sake of brevity, in the context of the present example, it is assumed the affected failure domain is the one in which the active arbiter resides. Those skilled in the art will appreciate if the active arbiter is not expected to be impacted there is no need to proceed with the pending fault processing.

At block 330, the node at issue (e.g., one of the storage nodes of the HA storage system or the active arbiter) responds to the indication regarding the pending fault initiates establishment of a new configuration for the HA storage system. In one embodiment, the new configuration has members including those of the storage nodes of the HA storage system in the affected failure domain, those of the storage nodes of the HA storage system in the non-affected failure domain, and the standby or backup arbiter, but not the active arbiter.

At block 340, one of the active members of the previous configuration performs a state transfer to the standby arbiter. For example, responsive to instantiation of the new configuration (i.e., after a majority of the members of the current configuration decide to install the new configuration), one of the active members of the previous configuration transfers state to the standby arbiter that enables it to take over as the active arbiter. According to one embodiment, as described further below with reference to FIG. 6, in addition to its role as a disambiguator and acting as a witness to facilitate maintaining quorum for the HA storage system, the active arbiter also serves as a replica of a key-value store that is also implemented on the storage nodes. In such an embodiment, the state transfer includes transferring the replica of the key-value store to the standby arbiter.

At block 350, the standby arbiter becomes the active arbiter. For example, responsive to receipt of the state information from one of the active members of the previous configuration, the standby arbiter may begin its new role serving as the active arbiter.

At block 360, the former active arbiter (the active arbiter from the prior configuration) becomes the standby arbiter. For example, responsive to being removed from the active configuration, the active arbiter enters the standby role and serves in this passive role.

At block 370, after impact of the failure, the new configuration serves data. For example, in the context of FIG. 1B, the surviving data replica (i.e., storage node 120b) and its collocated arbiter (i.e., arbiter node 130b) form a majority of the new configuration (i.e., new configuration 150) and responsive to performing a quorum evaluation process are able to establish the quorum condition necessary to continue to serve data from storage node 120b while the other data replica (i.e., storage node 120a) is offline.

As such, the data availability of a constrained deployment of an HA storage system with only two failure domains is automatically preserved in the presence of a pending fault that encompasses one of the data replicas as well as the arbiter function, thus improving the set of tolerable faults and availability of data in such a constrained deployment scenario. As explained above, without the proposed capability described herein to automatically reconfigure the HA storage system and activate the standby or backup arbiter in the surviving failure domain responsive to receipt of an indication regarding the pending fault, a constrained deployment HA storage system subjected to such a fault would lose the availability of data while the condition persists.

Figure 4:
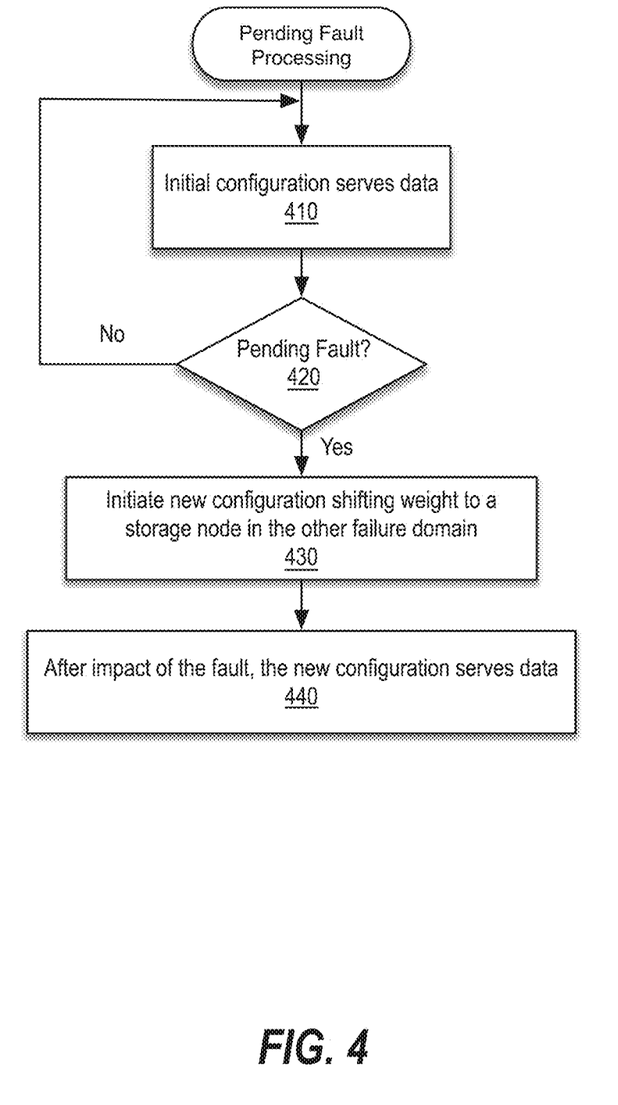
FIG. 4 is a flow diagram illustrating pending fault processing in accordance with an alternative embodiment.

FIG. 4 is a flow diagram illustrating pending fault processing in accordance with an alternative embodiment. In accordance with this alternative embodiment, the role of the arbiter in serving as a disambiguator (as described above in connection with FIGS. 1A-1B and FIG. 3) is replaced by giving one of an even number of host nodes a greater weight than the weight assigned to others of the host nodes. Also, the act of installing a new configuration with the standby arbiter as described above with reference to FIGS. 1A-1B and FIG. 3 is replaced by installing a new configuration of weighted values with selection of the replica that carries the greater weight shifted over to a replica in the non-impacted failure domain.

As above, the processing described with reference to FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more nodes of various forms, such as the nodes described with reference to FIG. 5 and/or FIG. 6 below. For sake of brevity, this flow diagram and the below description focus on processing related to various aspects of responding to a notification regarding a pending fault. Those skilled in the art will appreciate the components of the HA storage system may perform various other processing (e.g., the operations and processes performed in connection with providing or otherwise supporting a particular service by the HA storage system). For example, prior to commencement of pending fault processing, it is assumed an initial configuration of a constrained deployment of an HA storage system has been established in which at least one storage node of an even number of storage nodes distributed across two failure domains has been assigned a greater weight than the others.

At block 410, the initial configuration (e.g., initial configuration 240) serves data to users (e.g., people or applications) of the HA storage system.

At decision block 420, the HA storage system determines whether an indication regarding a pending fault (e.g., indication regarding pending fault 260) has been received. In one embodiment, the indication regarding the pending fault is directed to the failure domain that is expected to imminently be impacted. In an alternative embodiment, the indication regarding the pending fault can be received by any member of a current configuration of the HA storage system. As noted above in connection with FIG. 3, there are a variety of mechanisms by which the indication regarding the pending fault may be conveyed. Regardless of the particular mechanism by which the indication regarding the pending fault is communicated, responsive to receipt of the indication regarding the pending fault, processing continues with block 430; otherwise processing loops back to block 410 and the node at issue (e.g., storage node 220*a-b*) continues with its current task and the initial configuration continues to serve data.

For sake of brevity, in the context of the present example, it is assumed the affected failure domain is the one in which the higher-weighted data replica (e.g., storage node 230*a*) resides. Those skilled in the art will appreciate if the higher-weighted data replica is not expected to be impacted there is no need to proceed with the pending fault processing.

At block 430, an indication regarding a pending fault has been received. In one embodiment, responsive to the indication regarding the pending fault, the node at issue (e.g., any of the storage nodes of the HA storage system), initiates establishment of a new configuration for the HA storage system.

At block 440, after impact of the failure, the new configuration serves data. For example, in the context of FIG. 2B, the storage nodes 220*b* and 230*b* within failure domain 210*b* form a majority of the new configuration (i.e., new configuration 250) and responsive to performing a quorum evaluation process are able to establish the quorum condition necessary to continue to serve data while the other storage nodes 220*a* and 230*a* are offline. For purposes of clarity, in the context of the present example, the quorum condition relates to having a majority (3 or more) of the total weighted votes (5).

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 5:
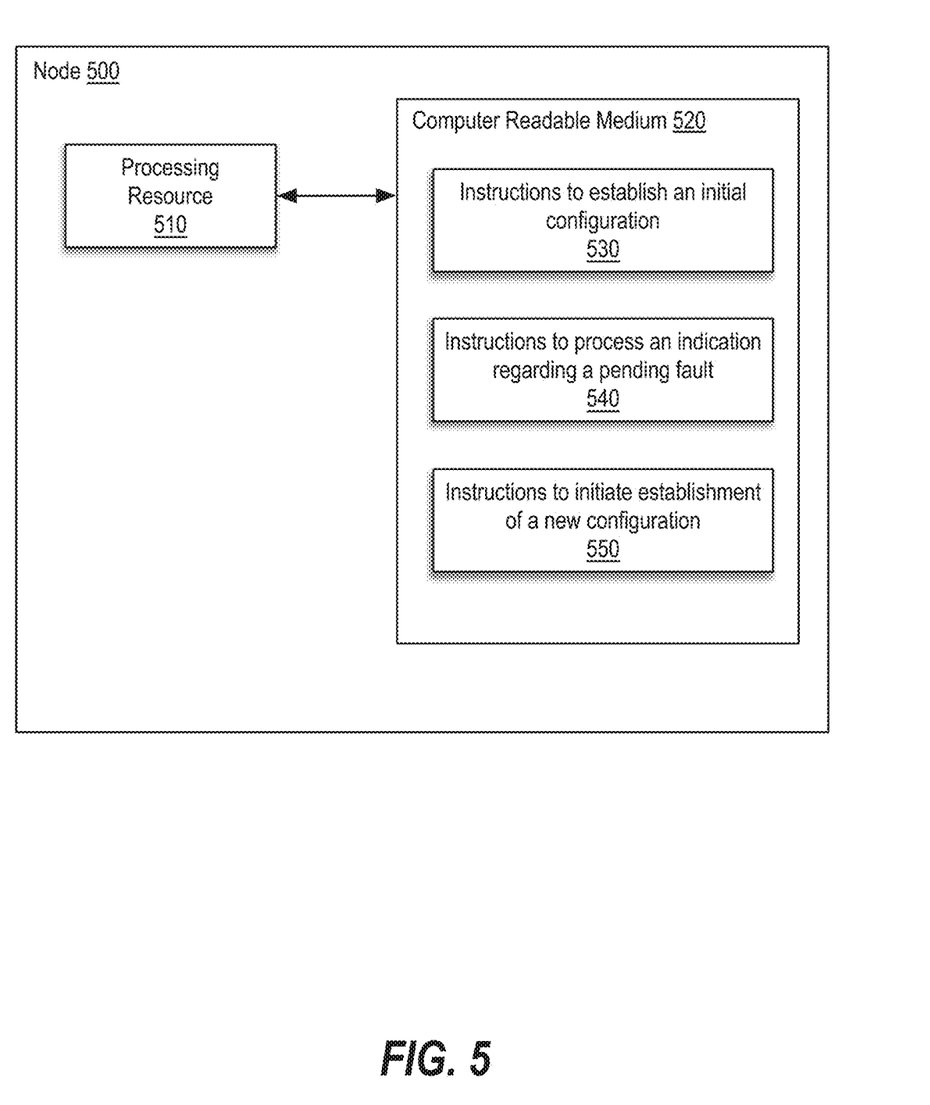
FIG. 5 is a block diagram illustrating a node of an HA storage system in accordance with an embodiment.

FIG. 5 is a block diagram illustrating a node 500 of an HA storage system in accordance with an embodiment. In the example illustrated by FIG. 5, node 500 includes a processing resource 510 coupled to a non-transitory, machine readable medium 520 encoded with instructions to maintain service availability for a constrained deployment of an HA storage system in the presence of a pending fault. The processing resource 510 may include a microcontroller, a microprocessor, central processing unit core(s), an ASIC, an FPGA, and/or other hardware device suitable for retrieval and/or execution of instructions from the machine readable medium 520 to perform the functions related to various examples described herein. Additionally or alternatively, the processing resource 510 may include electronic circuitry for performing the functionality of the instructions described herein.

The machine readable medium 520 may be any medium suitable for storing executable instructions. Non-limiting examples of machine readable medium 520 include RAM, ROM, EEPROM, flash memory, a hard disk drive, an optical disc, or the like. The machine readable medium 520 may be disposed within the node 500, as shown in FIG. 5, in which case the executable instructions may be deemed "installed" or "embedded" on the node 500. Alternatively, the machine readable medium 520 may be a portable (e.g., external) storage medium, and may be part of an "installation package." The instructions stored on the machine readable medium 520 may be useful for implementing at least part of the methods described herein.

In the context of the present example, the machine readable medium 520 is encoded with a set of executable instructions 530, 540, and 550. It should be understood that part or all of the executable instructions and/or electronic circuits included within one box may, in alternate implementations, be included in a different box shown in the figures or in a different box not shown.

Instructions 530, upon execution, cause the processing resource 510 to establish an initial configuration of the HA storage system. For example, in one embodiment in which redundant arbiter nodes are provided within two separate failure domains, a deterministic algorithm may be employed by the HA storage system that chooses which of the redundant arbiter nodes will serve as the initial active arbiter and which will serve as the initial standby or backup arbiter. In an alternative embodiment in which the role of the arbiter is replaced by giving one of an even number of host nodes in a storage cluster a greater weight than the weight assigned to the other nodes, a deterministic algorithm may be employed by the HA storage system that chooses which of the host nodes will carry the additional weighting.

Instructions 540, upon execution, cause the processing resource 510 to process an indication regarding a pending fault. In one embodiment, instructions 540 may correspond generally to instructions for performing decision block 320 of FIG. 3 or decision block 420 of FIG. 4. For example, instructions 540 may cause a storage node or an active arbiter to process an interrupt or poll the state of a register or a pin indicative of a pending fault.

Instructions 550, upon execution, cause the processing resource 510 to establish a new configuration. In one embodiment, instructions 550 may correspond generally to instructions for performing blocks 330, 340, 350 and 360 of FIG. 3. For example, in an embodiment in which redundant arbiter nodes are employed, instructions 550 may cause a member of the current configuration to, among other things, instantiate a new configuration for the HA storage system that accommodates for the fact that the active arbiter will soon be impacted by the fault. Alternatively, in an embodiment in which the role of the arbiter is replaced by giving one of an even number of data replicas a greater weight than the weight assigned to the others, instructions 540 may correspond generally to instructions for performing block 430 of FIG. 4. For example, instruction 540 may cause a member of the current configuration to instantiate a new configuration for the HA storage system having a different configuration of weighted values in which the excess weight of the currently higher-weighted data replica is shifted over to a data replica in the non-affected failure domain.

Figure 6:
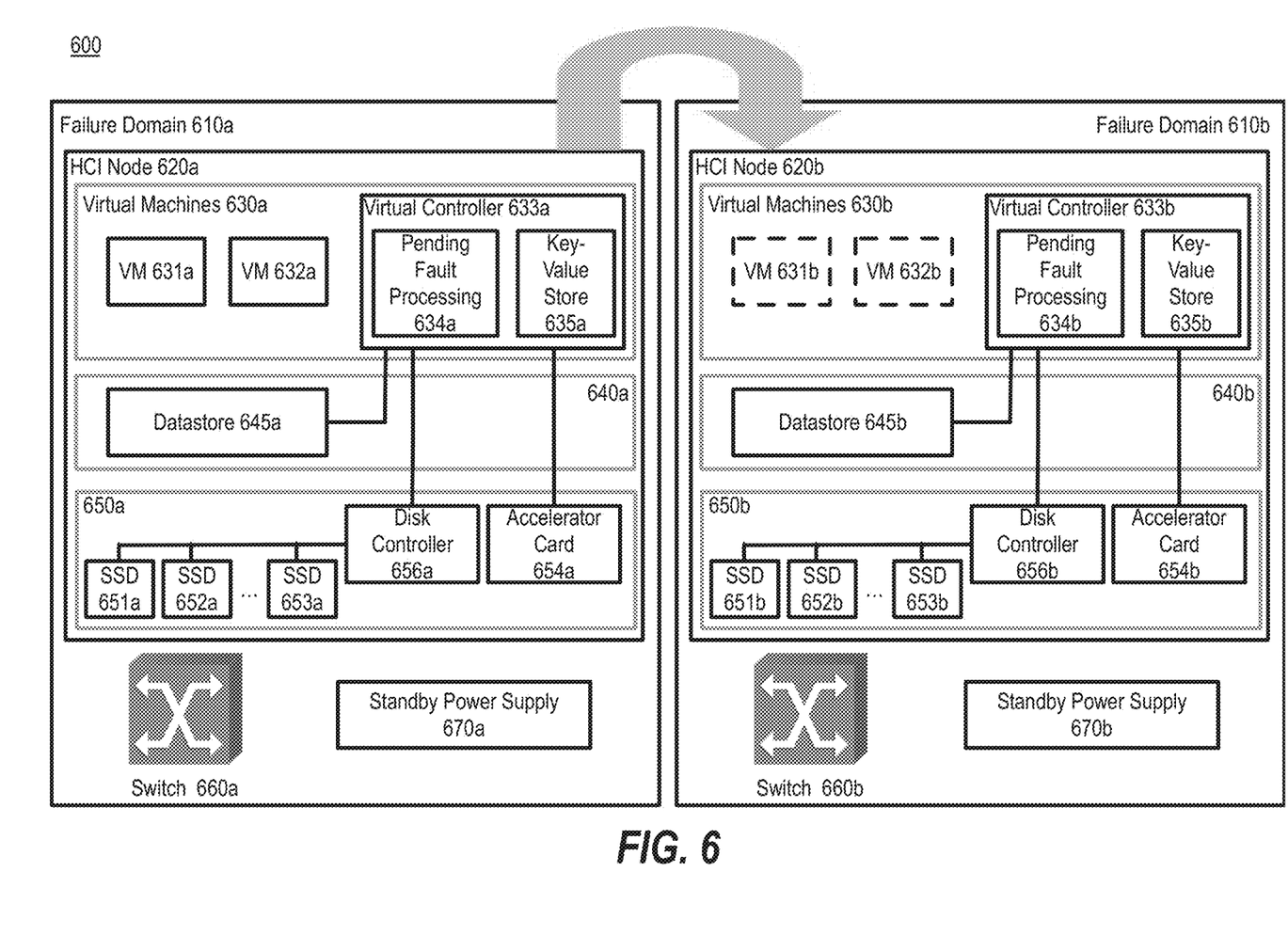
FIG. 6 is a block diagram illustrating a constrained deployment of an HA storage system with HyperConverged Infrastructure (HCI) nodes and redundant arbiter components in accordance with an embodiment.

FIG. 6 is a block diagram illustrating a constrained deployment of an HA storage system 600 with HyperConverged Infrastructure (HCI) nodes 620a-b and redundant arbiter components in accordance with an embodiment. HCI nodes 620a-b represent a non-limiting example of storage nodes 120a-b and 130a-b of FIGS. 1A-B and storage nodes 220a-b and 230a-b of FIGS. 2A-B.

In the context of the present example, failure domain 610a includes HCI node 620a, a switch 660a and a standby power supply 670a and failure domain 610b includes HCI node 620b, a switch 660b and a standby power supply 670b. HCI nodes 600a-b may have a software-centric architecture that integrates at least some of compute, storage, networking and virtualization resources and other technologies.

According to one embodiment, the HCI nodes 620a-b are servers, for example, x86 servers that combine microprocessor resources, storage, and storage networking in a single hyper converged system with advanced functionality. In the context of the present example, components of the HCI nodes 620a-b are shown grouped into three layers, a hardware platform layer 650a-b, a virtual machine manager (VMM) layer 640a-b, and a virtual machine layer 630a-b. It may be understood that abstraction or virtualization techniques other than virtual machines, such as container, also may be utilized to provide infrastructure described herein.

In this example, the virtual machine layer 630a is shown running two guest virtual machines (VMs) 631a and 632a, which may represent applications or services in support of serving data to users (e.g., people or applications) of the HCI node 620a-b and/or business applications/services independent of serving data. Those skilled in the art will appreciate there may be more or fewer VMs. According to one embodiment, virtual controller 633a-b, represents a storage software stack, implemented as a single VM per node, which controls various aspects of the HCI node 620a-b. In the present example, virtual controller 633a-b include a pending fault processing module 634a-b and a key value store 635a-b.

As noted above, in one embodiment, responsive to HCI node 620a being informed of or otherwise becoming aware of a pending fault, actions may be taken to preserve data availability. For example, pending fault processing module 634a may monitor for the existence of a pending fault and/or be initiated responsive to notification regarding a pending fault and perform all or some subset of pending fault processing described with reference to FIG. 3. Additionally, the virtual controller 633a may failover VMs 631a and 632a to failure domain (the surviving failure domain) in the form of VMs 613b and 632b and the data consumed by these VMs will remain available.

Key value store 635a-b may represent all or some subset of state information transferred to the standby arbiter so as to allow it to serve as an active arbiter in a new configuration established as a result of a pending fault. According to one embodiment, the key value store 635a-b is a key-value store implemented using a consensus algorithm (e.g., Paxos or Virtual Synchrony) for implementing replicated state machines.

Turning now to the VMM layer 640a-b, in one embodiment, a virtual machine hypervisor (not shown) runs on the underlying hardware platform layer 650a-b. In one embodiment, the hypervisor may be a bare metal hypervisor that is installed directly on the HCI node hardware just like an operating system. Alternatively, the hypervisor may be a hosted hypervisor. Those skilled in the art will appreciate the HCI nodes 620a-b may be designed to be hypervisor agnostic so as to allow users of the HCI nodes 620a-b to select a hypervisor that best suits their needs. Non-limiting examples of hypervisors include VMware vSphere, VMware ESXi, Oracle VM Server for x86, Microsoft Hyper-V server, open-source Kernel-Based Virtual Machine (KVM), Red Hat Enterprise Virtualization (RHEV), Xen, and Citrix XenServer.

In the context of the present example, VMM layer 640a-b also includes a datastore 645a-b. Datastore 645a-b may include logical containers that store files and/or provide storage resources on behalf or for the VMs 631a-b and VMs 632a-b. According to one embodiment, datastores 645a-b present storage to the VMM layer 640a-b as a Network File System (NFS) data store, for example.

According to an example embodiment, the hardware layer 650a-b may include a disk controller 656a-b and/or an accelerator card 654a. The disk controller 656a-b may represent a controller circuit that enables the virtual machines to communicate with the underlying storage resources, for example, solid state drives (SSDs) 651a-b, 652a-b, and 653a-b. In one embodiment, accelerator cards 654a-b are operable to offload data compression and/or data deduplication functions from the central processing units (CPUs) (not shown) of the HCI nodes 620a-b. For example, accelerator cards 654a-b may be in the form of Peripheral Component Interconnect Express (PCIe) modules that process writes and manage the compute-intensive tasks of deduplication and compression, thereby allowing the CPUs to run customer business applications.

Standby power supplies 670a-b may include a battery that provides power to electrical components within failure domains 610a-b, respectively, when AC power is lost. In one embodiment, activation of one of standby power supplies 670a-b may represent an indication of a pending fault (e.g., indication regarding pending fault 160 or 260). Those skilled in the art will appreciate activation of one of the standby power supplies 670a-b responsive to loss of AC power is simply one non-limiting example of numerous potential pending faults. For example, one or more of various types of sensors (e.g., a temperature sensor, a smoke sensor, a vibration sensor, a water leak detector or the like) can provide advanced warning of other types of imminent faults (e.g., overheating, a fire, an earthquake, a flood or the like) that might represent a pending fault in a particular implementation. Additionally, as noted above, non-limiting examples of other types of pending faults include a notification, a message or signal indicative of a planned shutdown, or some other imminent administrative maintenance action, for example, as indicated by a user of the HA storage system.

Switches 660a-b may be part of a switch fabric connecting failure domains 610a-b in communication and/or connecting HCI nodes 620a-b in communication with users. In one embodiment, the redundant arbiters (e.g., arbiter nodes 130*a-b*) may be processes running on switches 660*a-b*. Alternatively, the redundant arbiters may run on another hardware resource commonly deployed with an HA storage system or that is part of HCI node 620*a-b*. For example, in one embodiment, the redundant arbiters may be processes running on accelerator card 654*a-b*.

Those skilled in the art will appreciate although examples are described in the context of storage nodes and HA storage systems, the techniques can be applied to other types of distributed systems composed of other types of nodes (e.g. compute nodes, Input/Output nodes, and the like). The nodes of a distributed system may be any type of autonomous computing element, including, but not limited to, computer systems (e.g., clients, servers or peers) in virtual or physical form, one or more components of a computer system, computing elements, hardware devices, software entities or processes, or a combination thereof.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A method comprising:
   a first arbiter serving as an active arbiter to facilitate maintaining a quorum for a high-availability (HA) system comprising, within a first failure domain, the first arbiter and a first node;
   a second arbiter serving as a backup arbiter for the HA system, and the HA system comprising, within a second failure domain, the second arbiter and a second node;
   receiving, by the HA system, an indication of a pending fault impacting the first failure domain;
   responsive to the indication, initiating establishment of a new configuration for the HA system including the second arbiter; and
   enabling the second arbiter to serve as the active arbiter by transferring state information to the second arbiter.

2. The method of claim 1, wherein the HA system comprises an HA storage system.

3. The method of claim 2, wherein the first node and the second node each comprise a hyperconverged infrastructure node that integrates at least compute and storage virtualization resources.

4. The method of claim 3, wherein the first arbiter is deployed within an Input/Output (I/O) acceleration card of the first node and wherein the second arbiter is deployed within an I/O acceleration card of the second node.

5. The method of claim 1, further comprising transitioning, by the first arbiter, into a passive role to serve as the backup arbiter.

6. The method of claim 1, wherein the pending fault comprises a power failure or a planned shutdown.

7. The method of claim 1, wherein the first failure domain comprises a first equipment rack and the second failure domain comprises a second equipment rack.

8. The method of claim 1, wherein the first failure domain comprises a first equipment room and the second failure domain comprises a second equipment room.

9. The method of claim 1, wherein the first arbiter is deployed within a first switch of a pair of redundant switches and the second arbiter is deployed within a second switch of the pair of redundant switches.

10. A non-transitory computer-readable medium comprising instructions executable, by a processing resource of a high-availability (HA) storage system, to: receive an indication of a pending fault impacting a first failure domain of the HA storage system when the HA storage system is in a first configuration, the first configuration comprising a first arbiter node, of the first failure domain, to serve as an active arbiter to facilitate maintaining a quorum for the HA storage system, a first storage node of the first failure domain, and a second storage node of a second failure domain; wherein a second arbiter node of the second failure domain is to serve as a backup arbiter; responsive to the indication, initiate establishment of a second configuration for the HA storage system, the second configuration having a plurality of members including the first storage node, the second storage node, and the second arbiter node; and responsive to a majority of the plurality of members installing the second configuration, enable the second arbiter node to serve as the active arbiter by transferring state information to the second arbiter node.

11. The non-transitory computer-readable medium of claim 10, wherein the first storage node and the second storage node comprise hyperconverged infrastructure nodes that integrate at least compute and storage virtualization resources.

12. The non-transitory computer-readable medium of claim 11, wherein the first arbiter node is deployed within an Input/Output (I/O) acceleration card of the first storage node and wherein the second arbiter node is deployed within an I/O acceleration card of the second storage node.

13. The non-transitory computer-readable medium of claim 10, wherein the pending fault comprises a power failure or a planned shutdown.

14. The non-transitory computer-readable medium of claim 10, wherein the first failure domain comprises a first equipment rack and the second failure domain comprises a second equipment rack.

15. The non-transitory computer-readable medium of claim 14, wherein the first failure domain further comprises a first switch of a pair of redundant switches coupled to the first equipment rack and the second equipment rack, wherein the second failure domain further comprises a second switch of the pair of redundant switches, wherein the first arbiter node is deployed within the first switch and wherein the second arbiter node is deployed within the second switch.

16. A method comprising:
   receiving an indication of a pending fault impacting a first failure domain of a constrained deployment of a high-availability (HA) storage system serving data in a first configuration;
   wherein the HA storage system comprises a plurality of nodes each having a respective assigned weight value;
   wherein the HA storage system comprises a first failure domain comprising first and second nodes of the plurality of nodes, and a second failure domain comprising third and fourth nodes of the plurality of nodes; and
   wherein, in the first configuration, the respective assigned weight value of the second node of the first failure domain is greater than each respective assigned weight value of each of the other nodes of the plurality of nodes; and
   responsive to the indication, causing establishment of a second configuration for the HA storage system, in which the respective assigned weight value of the fourth node is greater than the respective assigned weight values of each of the other nodes of the plurality of nodes, by shifting a portion of the respective assigned weight value of the second node to the respective assigned weight value of the fourth node, wherein after impact of the pending fault, the HA storage system maintains an ability to serve data as a result of the third node and the fourth node having a quorum.

17. The method of claim 16, wherein the first node and the second node each comprise a hyperconverged infrastructure node that integrates at least compute and storage virtualization resources.

18. The method of claim 16, wherein the pending fault comprises a power failure.

19. The method of claim 16, wherein the pending fault comprises a planned shutdown.

20. The method of claim 16, wherein the first failure domain comprises a first equipment rack and the second failure domain comprises a second equipment rack.

* * * * *